UNITED STATES PATENT OFFICE.

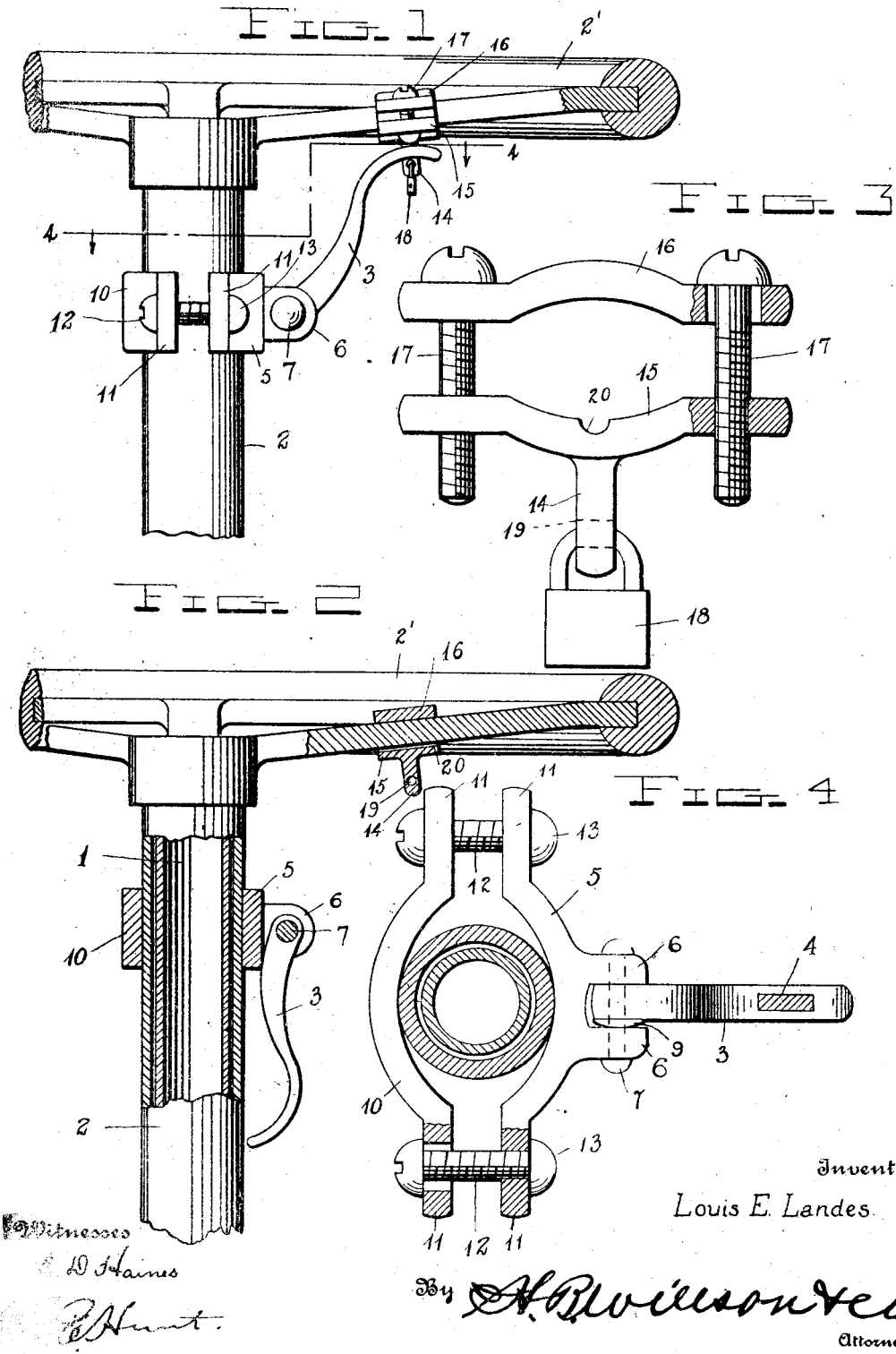

LOUIS E. LANDES, OF LOS ANGELES, CALIFORNIA.

LOCK FOR MOTOR-VEHICLE STEERING-WHEELS.

1,055,923. Specification of Letters Patent. Patented Mar. 11, 1913.

Application filed November 25, 1912. Serial No. 733,488

*To all whom it may concern:*

Be it known that I, LOUIS E. LANDES, a citizen of the United States, residing at Los Angeles, in the county of Los Angeles and State of California, have invented certain new and useful Improvements in Locks for Motor-Vehicle Steering-Wheels; and I do declare the following to be a full, clear, and exact description of the invention, such as will enable others skilled in the art to which it appertains to make and use the same.

This invention relates to improvements in locks for the steering wheels of motor vehicles.

One object of the invention is to provide a lock of this character which may be readily applied and securely fastened to the casing of the steering wheel shaft and engaged with the steering wheel of any motor vehicle for the purpose of securely locking the wheel.

A further object is to provide a lock for steering wheels which will be simple, strong, durable and inexpensive in construction, efficient and reliable in operation and well adapted to the purpose for which it is designed.

With these and other objects in view, the invention consists of certain novel features of construction and the combination and arrangement of parts as will be more fully described and claimed.

In the accompanying drawings: Figure 1 is a side view of a portion of the upper end of the steering wheel shaft and steering wheel of a motor vehicle showing my improved lock applied thereto and illustrating the lock in operative position; Fig. 2 is a similar view showing the steering wheel shaft and the lock in section and illustrating the lock in a released or inoperative position; Fig. 3 is a detail end view of the keeper member of the lock which is applied to one of the spokes of the steering wheel. Fig. 4 is a plan view of the hasp member of the lock and the means for attaching the same to the steering wheel shaft.

Referring more particularly to the drawings 1 denotes the steering wheel shaft, 2 denotes the casing of the shaft and 2' denotes the steering wheel which may be secured to the upper end of the shaft in any suitable manner. These parts may be of the usual or preferred construction and to the same is secured my improved locking mechanism comprising a hasp member which is in the form of a suitably curved bar 3 having therein near its outer end a keeper engaging slot 4. The inner end of the hasp 3 is pivotally secured to one member 5 of an attaching clip by means of which the hasp is secured to the casing 2 of the steering wheel shaft. The clip member 5 is in the form of a curved plate having on its outer side spaced apertured lugs 6 having therein a pivot pin 7 with which the inner end of the hasp is pivotally engaged. The spaced apertured lugs 6 are of greater width than the width of the hasp 3 and between one side of the inner end of the hasp and the adjacent lugs 6 is a spring washer 9 through which the pivot pin 7 passes. The washer 9 is preferably concave and when engaged between the hasp and one of the lugs 6 of the clip will hold the hasp in frictional engagement with the opposite lug and thus prevent the hasp from rattling or swinging freely between the lugs 6 of the clip. The other member of the clip comprises a curved plate 10 which corresponds in size and shape to plate 5 of the clip and on the ends of said plates 5 and 10 are apertured lugs 11 with which are engaged clamping screws 12 said screws passing freely through the aperture of the lugs of the plate or clip member 10 and having threaded engagement with the aperture in the lugs of the clip member 5 whereby said clip members may be adjustably connected with the tubular casing of the steering wheel shaft as clearly shown in Figs. 1 and 4 of the drawing. After the clip members have been properly adjusted the ends of the screws 12 are preferably upset or headed as at 13 to prevent the removal of the screws or tampering with the clip and hasp member of the lock.

The keeper member of the lock comprises a flat bolt or stud 14 which is formed integrally with the outer side of one member 15 of an attaching clip, the opposite member 16 of which is adjustably screwed to the member 15 by clamp screws 17 which are loosely engaged with smooth apertures in the clip member 16 and with threaded apertures in the clip member 15 whereby said members are drawn together into tight clamping engagement with one of the spokes of the steering wheel. After the clip has thus been secured to the spoke of the wheel the ends of the screws 17 are headed or upset to prevent the removal of the clip members or tampering with the keeper member of the lock. The bolt or stud 14 is fastened on the spoke of the wheel in a suitable position to be engaged by the slot 4 in the end of the hasp 3, said end of the hasp being secured in engagement with the bolt or stud by the pad lock 18 on any suitable device which is engaged with a transverse aperture 19 formed in the bolt or stud near its outer end as shown.

If desired one or both of the members of the hasp or keeper attaching clips may be provided on its near side midway between its end with transverse notches 20 which will impart more or less resiliency or spring action to the clip members thus causing the latter to more closely fit around the parts with which they are engaged and to be more readily drawn or clamped into rigid engagement therewith.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A lock for the steering wheels of motor vehicles comprising a hasp attaching clip adapted to be secured to the casing of the steering wheel shaft, a hasp pivotally secured to said clip and having in its outer end a keeper engaging slot, a keeper attaching clip adapted to be secured to the steering wheel, an apertured bolt or stud carried by one member of said keeper and adapted to receive the slotted end of the hasp and a lock adapted to be engaged with said apertured stud to fasten the hasp in engagement therewith.

2. A lock for the steering wheels of motor vehicles comprising a hasp attaching clip having on one member thereof apertured lugs, a hasp pivotally secured at one end between said lugs and having in its outer end a keeper engaging slot, a spring washer arranged between one of said lugs and said hasp whereby the latter is held in frictional engagement with the opposite lug and thereby prevented from rattling, a keeper attaching clip adapted to be secured to the spokes of the steering wheel, an apertured stud or bolt formed on and projecting from the outer side of one of said clip members and adapted to receive the slotted end of the hasp when swung to an operative position, and a lock adapted to be engaged with the apertured outer end of said stud or bolt whereby the hasp is secured in operative engagement therewith.

In testimony whereof I have hereunto set my hand in presence of two subscribing witnesses.

LOUIS E. LANDES.

Witnesses:
JAMES O. MORGAN,
JOSEPH R. MORGAN.